No. 746,952. PATENTED DEC. 15, 1903.
O. O. GILBERTSON.
CORN HARVESTER AND HUSKER.
APPLICATION FILED JULY 30, 1903.
NO MODEL. 3 SHEETS—SHEET 1.
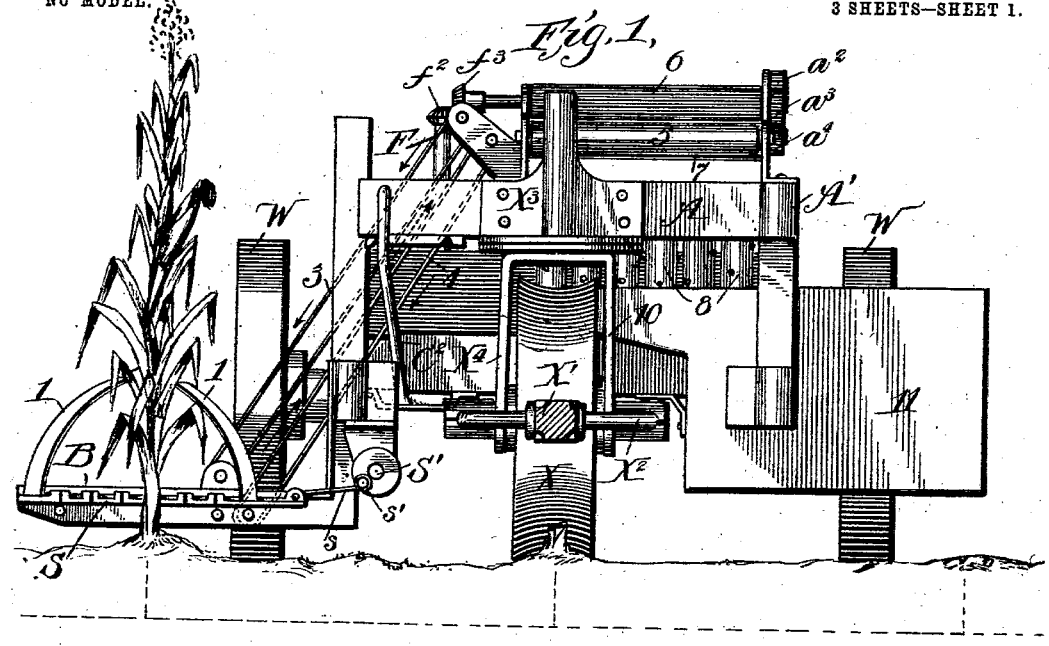
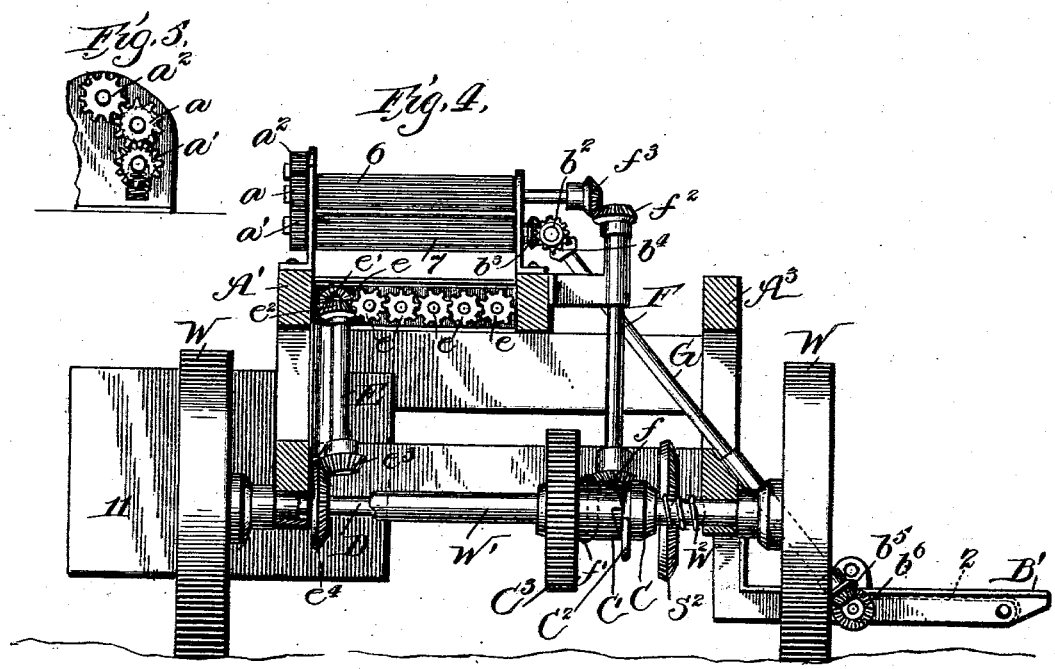
WITNESSES:
G. P. Kingsbury.
Edw. W. Byrn.
INVENTOR
Ole O. Gilbertson.
BY Munn & Co.
ATTORNEYS.

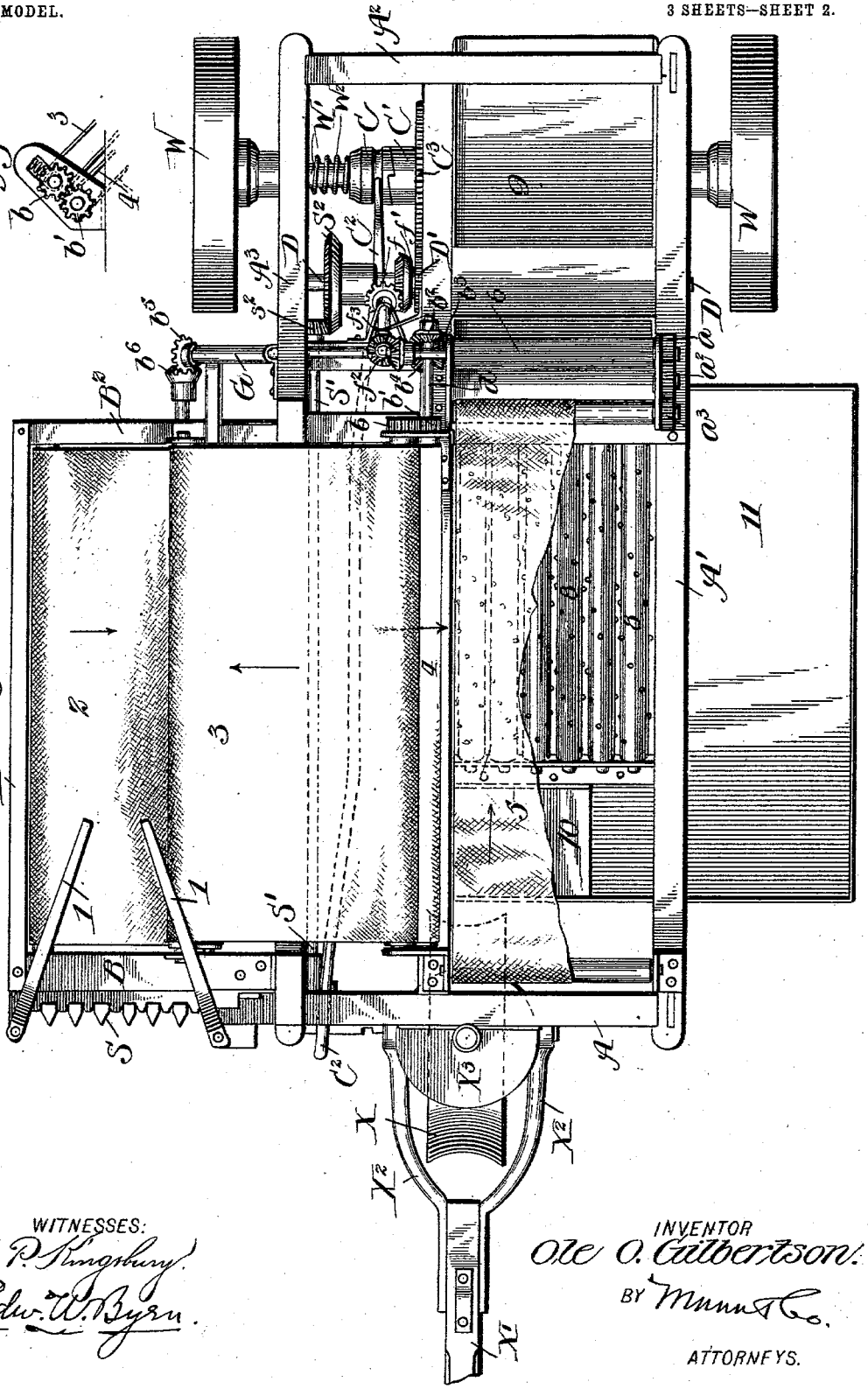

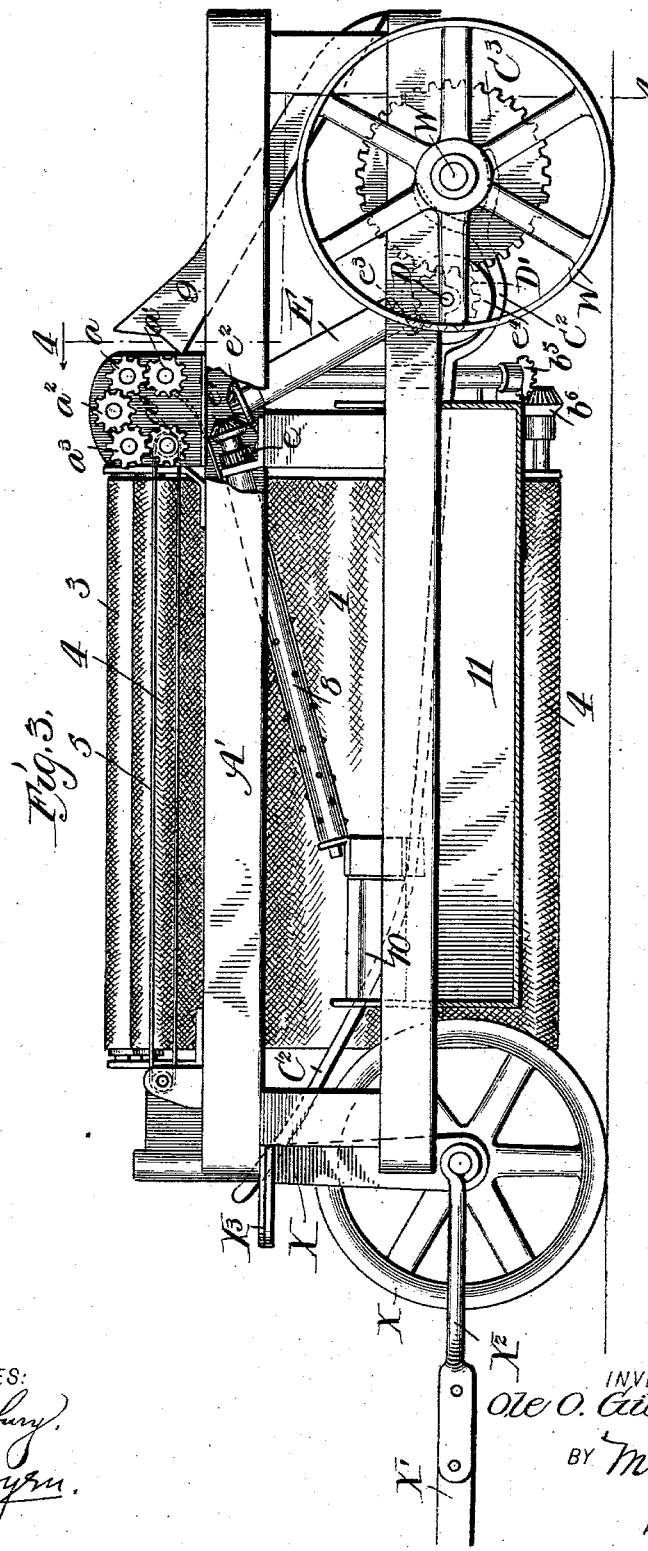

No. 746,952.                                    Patented December 15, 1903.

UNITED STATES PATENT OFFICE.

OLE O. GILBERTSON, OF KASSON, MINNESOTA.

CORN HARVESTER AND HUSKER.

SPECIFICATION forming part of Letters Patent No. 746,952, dated December 15, 1903.

Application filed July 30, 1903. Serial No. 167,571. (No model.)

*To all whom it may concern:*

Be it known that I, OLE O. GILBERTSON, a citizen of the United States, residing at Kasson, in the county of Dodge and State of Minnesota, have invented a new and useful Improvement in Corn Harvesters and Huskers, of which the following is a specification.

My invention is in the nature of an improved corn harvester and husker designed to cut the stalks of corn in the field, to pull the ears of corn from the stalks, and remove the husks from the ears by the simple passage of the machine across the field. It is so organized as to conduct these operations in a continuous way by a simple, strong, and practical construction, also to press down and roll the stub ends of the cut stalks to a level surface with the ground to facilitate subsequent cultivation of the ground, and also to enable the machine to turn in the shortest possible space.

It consists in the novel construction and arrangement of the machine, which I will now proceed to describe with reference to the drawings, in which—

Figure 1 is a front elevation of the machine with the tongue in cross-section. Fig. 2 is a top plan view with a part of one of the carrier-belts removed. Fig. 3 is a side elevation of the machine, partly in section, the view being taken from the side opposite the sickle. Fig. 4 is a rear elevation, partly in section, on the broken line 4 4 of Fig. 3; and Figs. 5 and 6 are details.

Referring to Figs. 1 and 2, A A' A² A³ represent an elevated rectangular main framework mounted upon two rear wheels W W and one front wheel X, the latter having a broad and concave tread or face. B B' B² is another rectangular framework projecting laterally from the main framework at a lower level and carrying along its front edge the sickle or cutter S. These two sections of the framework are rigidly connected together and carry all the working parts of the machine.

I will first describe the main features of the working parts of my machine and afterward describe their driving-gears and operating mechanisms.

Referring to Figs. 1 and 2, the cornstalks cut by the sickle S are guided as they fall by rearwardly-converging fender-arms 1 1 and are received on the carrier-apron 2 in position parallel with the line of draft of the machine. The carrier-apron 2 takes the stalks laterally to the two inclined elevator-aprons 3 and 4. The adjacent faces of these aprons rising together carry the stalk up to an elevated horizontal apron 5, whose upper surface runs to the rear and carries the stalk between the corrugated snapping-rolls 6 and 7. These rolls pass the stalks and blades on between them to a rearwardly-discharging chute 9, which delivers said stalks upon the ground. The snapping-rolls are so constructed and adjusted that they will not allow the more bulky ears of corn to pass between them, and said ears are so restrained while the stalks are being pulled through that the ears are snapped off and drop onto a series of six husking-rolls 8. These husking-rolls are thickly studded with small projecting pins, and said rolls rotate together in pairs. The pins tear the shucks off from the ears of corn and pass the shucks down between the rolls onto the ground, while the hard ears of shucked corn are held upon the surface of the rolls and gradually work their way down the incline of the rolls and are dumped into a chute 10, which in turn discharges them into an elongated box 11, arranged on the framework of the machine on the opposite side from the sickle. This box is arranged longitudinally to the machine and is of sufficient capacity to hold the corn obtained by one trip around an average-size field. By placing the box 11 on the opposite side of the machine from the sickle and its attachments the box and its contents are made to balance the hanging sickle-frame and aprons, which thus require no supporting-wheel at the outer edge to run upon the ground.

The front part of the main frame is carried upon a caster-wheel X, which turns upon a vertical spindle. The horizontal axle of this wheel is journaled in the hounds X², to which is attached the tongue X' in the horizontal plane of the axle. The caster-wheel is carried in the yoke X⁴, which has an upwardly-projecting spindle that is retained in a socket of a turn-table X⁸, firmly bolted to the front upper part of the main frame. This arrangement permits the tongue and front wheel to be turned to nearly a right-angular position to the machine, so as to make a short turn at the end of the row, and thus cut the corn to the end of the row. The caster-wheel is made with a broad tread and a slightly-concave face, and the position of this wheel is so arranged in relation to the sickle that when the sickle is cutting one row of corn the concave caster-wheel will run upon the stubble or stubs of the previously-cut row of cornstalks, as seen in Fig. 1, so that these stubs and the corn-hills will be mashed down, and thus leave the surface of the ground level, or nearly so, to facilitate plowing and the subsequent cultivation of the field. By making the tread of the wheel concave it forms a peripheral groove by which it is easily kept in line over the row of corn-stubble and also serves to guide the machine in a parallel line to the row of corn being cut.

It will be noticed that the draft connection is attached to the front crushing-wheel X below the turn-table and spindle-socket and at or near the axle of the said wheel. This secures an important result, as follows: This front crushing-wheel in mashing down the stub ends of the stalks encounters a strong strain to the rear, due to the stiff upright stub ends of the stalks. This strain if allowed to come upon the vertical spindle and turn-table has a tendency to strain the spindle in its socket-bearing and to tilt the turn-table, producing unequal wear and damaging strain and friction, which soon produces a looseness at the vertical bearing and interferes with and changes the true vertical axis of the front wheel. By connecting the draft attachment below the turn-table and to or near the horizontal axis of the front wheel this rearward stress on the front wheel produced by the stiff stub ends of the cornstalks is entirely obviated and a true vertical axis and free turning of the front wheel is conserved. It will also be noticed that the draft strain of the team tends to hold the front wheel in true parallelism with the line of draft and prevents wabbling, thus insuring its spacing and guiding function.

To drive the various working parts of the machine, this is all affected by the axle W' of the rear running wheels W W. On this axle is arranged a clutch C C', the portion C of which is held by coil-spring W² into engagement with the portion C', which is rigidly connected to a main driving-gear C³. The sliding portion C of the clutch is adjusted into or out of engagement with the portion C' by means of the forked lever C², which extends to the forward part of the machine, where the driver's seat is to be located. The main gear-wheel C³ engages and drives a pinion D' on a countershaft D, from which power is transmitted to the various parts of the machine.

For running the sickle S its pitman s, Fig. 1, is connected to a crank-pin s' on a longitudinal shaft S', Fig. 2, under the machine, which at the rear end bears a small bevel-gear $s^2$, that is engaged by a large bevel-gear $s^3$, rigidly fixed to the counter-shaft D.

To run the husking-rolls 8, the latter are geared together in pairs by equal gear-wheels $e$ on the upper ends of the rolls, as seen in Figs. 3 and 4, and the shaft of one of these rolls is provided with a bevel-wheel $e'$, which engages a bevel-wheel $e^2$ on the upper end of an inclined shaft E. This shaft bears on its lower end a bevel-gear $e^3$, that engages and receives motion from a bevel-gear $e^4$ on the counter-shaft D. Near the other end of the counter-shaft there is an inclined shaft F, which at its lower end bears a bevel-gear $f$, that engages and receives motion from a bevel-gear $f'$ on the counter-shaft. The inclined shaft F at its upper end has (see Fig. 4) a bevel-gear $f^2$, that engages a bevel-gear $f^3$ on the shaft of the upper snapping-roll 6.

To run the upper horizontal apron 5, (see Fig. 3,) one of the rollers has a gear-wheel $a^4$, which through two idle wheels $a^2 a^3$ receives motion from a gear-wheel $a$ on the upper snapping-roll, 6. This same gear-wheel $a$ of the upper snapping-roll (see Fig. 4) meshes with and drives a gear-wheel $a'$ on the lower snapping-roll 7.

To run the sickle-apron 2, the lower snapping-roll 7 (see Fig. 4) is provided with a bevel-gear $b^3$, which drives a bevel-gear $b^2$, and this in turn drives a bevel-gear $b^4$ on the upper end of an inclined shaft G, which at its lower end carries a bevel-gear $b^5$, that meshes with and drives a bevel-gear $b^6$ on the end of the inner roll, which carries the sickle-apron 2.

To drive the two elevator-aprons 3 and 4, (see Fig. 2,) the upper roller of the lower apron 4 has its shaft prolonged at $d$ to carry the bevel-gear $b^2$ and also has a rigidly-attached pinion $b'$, that meshes with a pinion $b$ on the shaft of the upper roller of apron 3.

For the proper running of the machine the snapping-rolls should be allowed to yield slightly to and from each other, and for this purpose I make the lower snapping-roll spring-seated at each end, as shown in Fig. 5. In a like manner and for a similar purpose the upper roll of the upper elevator-apron 3 is made yielding by similar springs, as shown in Fig. 6.

Having thus described my invention, what I claim as new, and desire to secure by Letters Patent, is—

1. A corn-harvester having a stalk-cutter arranged upon one side of the same and having a single supporting-wheel in front, a yoke-frame carrying the axle of said wheel and having a vertical socket-bearing and turn-table in the upper portion of the main frame, and a draft attachment connected to the front wheel below the turn-table, said wheel being spaced from the cutter as described to crush down the previously-cut row of corn-stubble while the cutter is acting upon the standing row of corn substantially as described.

2. A corn-harvester having a stalk-cutter arranged upon one side of the same and having a single supporting-wheel in front made with a peripheral groove and spaced from the cutter as described to crush down the cut stubble of corn and also guide the machine substantially as described.

3. A corn harvester and husker comprising a main frame, a laterally-projecting cutter arranged upon one side of the main frame, inclined elevator-belts running transversely upward, a longitudinal carrying-belt with transverse snapping-rolls at its rear end, a husking device arranged in the middle of the machine below the carrying-belt and consisting of inclined longitudinally-arranged spiked rollers, and a laterally-projecting corn-receiving box arranged on the opposite side of the machine from the cutting device to balance the machine substantially as described.

4. A corn harvester and husker comprising a main frame having its forward end supported upon a single running wheel turning about a vertical axis, a laterally-projecting cutter arranged on one side, a husking device arranged in the middle, and a laterally-projecting corn-receiving box arranged on the opposite side of the machine from the cutter to balance the same upon the single front wheel substantially as described.

5. A corn harvester and husker, comprising a laterally-projecting cutter having an inwardly-running apron, two inclined elevator-aprons extending from the cutter-apron to the top of the machine, a horizontal and longitudinally running apron arranged at the top of the machine, a pair of snapping-rolls arranged at the rear of this upper horizontal apron, a chute extending rearwardly from the snapping-rolls, a series of spiked husking-rolls arranged beneath the upper horizontal apron and inclined forwardly and downwardly from the snapping-rolls, a corn-receiving box arranged at the opposite side of the machine from the cutting device, a trough or chute extending from the forward and lower end of the husking-rolls to the corn-box, and means for operating the parts substantially as and for the purpose described.

OLE O. GILBERTSON.

Witnesses:
AUGUST E. ANDERSON,
A. A. JOHNSON.